United States Patent [19]
Gillett et al.

[11] Patent Number: 5,750,278
[45] Date of Patent: May 12, 1998

[54] SELF-COOLING MONO-CONTAINER FUEL CELL GENERATORS AND POWER PLANTS USING AN ARRAY OF SUCH GENERATORS

[75] Inventors: James E. Gillett, Greensburg; Jeffrey T. Dederer, Valencia; Paolo R. Zafred, Pittsburgh, all of Pa.

[73] Assignee: Westinghouse Electric Corporation, Pittsburgh, Pa.

[21] Appl. No.: 513,468

[22] Filed: Aug. 10, 1995

[51] Int. Cl.$^6$ .............................. H01M 8/04; H01M 2/00
[52] U.S. Cl. ..................... 429/24; 429/26; 429/34; 429/163
[58] Field of Search ..................... 429/24, 26, 34, 429/163

[56] References Cited

U.S. PATENT DOCUMENTS

| | | | |
|---|---|---|---|
| 3,972,731 | 8/1976 | Bloomfield et al. | 136/86 R |
| 4,395,468 | 7/1983 | Isenberg | 429/31 |
| 4,476,196 | 10/1984 | Poppel et al. | 429/32 |
| 4,476,198 | 10/1984 | Ackerman et al. | 429/32 |
| 4,622,275 | 11/1986 | Noguchi et al. | 429/17 |
| 4,640,875 | 2/1987 | Makiel | 429/30 |
| 4,664,986 | 5/1987 | Draper et al. | 429/26 |
| 4,808,491 | 2/1989 | Reichner | 429/13 |
| 5,169,730 | 12/1992 | Reichner | 429/20 |
| 5,338,622 | 8/1994 | Hsu ey al. | 429/26 |
| 5,413,879 | 5/1995 | Domeracki et al. | 429/30 |
| 5,449,857 | 9/1995 | Longardner et al. | 429/163 |
| 5,487,958 | 1/1996 | Tura | 429/163 |
| 5,501,781 | 3/1996 | Hsu et al. | 429/34 |
| 5,573,867 | 11/1996 | Zafred | 429/17 |

FOREIGN PATENT DOCUMENTS 0 321 069   6/1989   European Pat. Off.

OTHER PUBLICATIONS

"Solid Oxide Fuel Cell", Westinghouse Electric Corporation, Oct. 1992.

Primary Examiner—Kathryn L. Gorgos
Assistant Examiner—Edna Wang
Attorney, Agent, or Firm—D. P. Cillo

[57] ABSTRACT

A mono-container fuel cell generator (10) contains a layer of interior insulation (14), a layer of exterior insulation (16) and a single housing (20) between the insulation layers, where fuel cells, containing electrodes and electrolyte, are surrounded by the interior insulation (14) in the interior (12) of the generator, and the generator is capable of operating at temperatures over about 650° C., where the combination of interior and exterior insulation layers have the ability to control the temperature in the housing (20) below the degradation temperature of the housing material. The housing can also contain integral cooling ducts, and a plurality of these generators can be positioned next to each other to provide a power block array with interior cooling.

19 Claims, 6 Drawing Sheets

SELF-COOLING MONO-CONTAINER FUEL CELL GENERATORS AND POWER PLANTS USING AN ARRAY OF SUCH GENERATORS

GOVERNMENT CONTRACT

The Government of the United States of America has rights in this invention, pursuant to Contract No. DE-FC21-91MC28055 with the United States Department of Energy.

FIELD OF THE INVENTION

The invention relates to heat controlled, solid oxide electrolyte, fuel cell generators, and to an array of such generators disposed in a mono-container shell, for use with a variety of auxiliary components in a power generation system of the 100 kW to 50 MW plus capacity.

BACKGROUND AND SUMMARY OF THE INVENTION

Fuel cell based, electrical generator apparatus ("generators") utilizing solid oxide electrolyte fuel cells ("SOFC") disposed within a housing and surrounded by insulation are well known, and taught, for example, by U.S. Pat. Nos. 4,395,468 (Isenberg) and "Solid Oxide Fuel Cell", Westinghouse Electric Corporation, October 1992, for tubular SOFC; U.S. Pat. No. 4,476,196 (Poppel, et al.) for flat plate SOFC; and U.S. Pat. No. 4,476,198 (Ackerman, et al.) for "corrugated" SOFC, all herein incorporated by reference. The tubular type fuel cells can comprise an open or closed ended, axially elongated, ceramic tube air electrode material, which can be deposited on a ceramic support tube, completely covered by thin film ceramic, solid electrolyte material. The electrolyte is substantially covered by cermet fuel electrode material, except for a thin, axially elongated, interconnection material. The flat plate type fuel cells can comprise a flat array of electrolyte and interconnect walls, where electrolyte walls contain thin, flat layers of cathode and anode materials sandwiching an electrolyte. The "corrugated" plate type fuel cells can comprise a triangular or corrugated honeycomb array of active anode, cathode, electrolyte and interconnect materials. Other fuel cells not having a solid electrolyte, as molten carbonate fuel cells are also well known, and can be insulated using the mono-container of this invention.

In construction of fuel cell generators, stable insulation was thought essential, and both interior and exterior steel housing shells, with the high temperature insulation between them, were thought important to protect the insulation from hydrogen gas or other fuel gas permeation, which could cause loss of insulating gases from the insulation pores, as taught in U.S. Pat. No. 4,640,875 (Makiel). Appropriate seals for a two part interior housing are also taught in that patent, allowing for radial and longitudinal expansion of the interior housing during thermal cycling and operation of the generator. Use of an inner metal canister to protect a certain portion of the insulation, and act as one wall of corner heating conduits is taught in U.S. Pat. No. 4,808,491 (Reichner). This dual metal housing design was the primary configuration for experimental 25 kW generators. In all cases, insulation was disposed on the inside of the exterior metal housing.

In previous designs, the oxidant air feed manifold system, which could be similar to that shown in U.S. Pat. No. 4,664,986 (Draper et al.), and portions of the inner metal canister, were contacted with reacted, depleted oxidant/fuel hot exhaust gases in a combustion chamber, which resulted in high interior metal housing temperatures. High metal housing temperatures can be handled for a single generator by using exotic steels and ceramic materials. However, for commercial applications, where an array of multiple generators might be electrically connected to provide MW system output, active cooling would be required on sides of those generators not located on the periphery of the system. The high cost of specialty steels and ceramics for single generators remains a problem, and the problem of cooling the interior of an array of solid oxide fuel cell generators poses serious difficulties not previously addressed. Without such central cooling, buckling of containment vessels near the center of the array could result after long operation.

A variety of fuel cell systems are described in the literature. In U.S. Pat. No. 3,972,731 (Bloomfield et al.), a pressurized fuel cell power plant is described. There, air is compressed by compressor apparatus, such as a compressor and turbine which are operably connected, and powered by waste energy produced by the power plant in the form of a hot pressurized gaseous medium, such as fuel cell exhaust gases. These exhaust gases are delivered into the turbine, which drives the compressor for compressing air delivered to the fuel cells. In U.S. Pat. No. 5,413,879 (Domeracki et al.) a SOFC was also integrated into a gas turbine system. There, pre-heated, compressed air is supplied to a SOFC along with fuel, to produce electric power and a hot gas, which gas is further heated by combustion of unreacted fuel and oxygen remaining in the hot gas. This higher temperature gas is directed to a topping combustor that is supplied with a second stream of fuel, to produce a still further heated gas that is then expanded in a turbine.

U.S. Pat. No. 4,622,275 (Noguchi et al.) also describes a fuel cell power plant, where reformed, reactive fuel is fed to an anode of the cell, an expansion turbine connected to a compressor feeds compressed gas into the cathode of the cell, which compressed gas is mixed with anode exhaust gas which had been combusted.

As pointed out previously, in power plant applications, arrays of fuel cell generators, modules, or power blocks will have to be cooled in the interior of the array, to prevent overheating and possible failure of non-ceramic components. Also, to be commercially competitive, the number of housing shells must be reduced. It is one of the objectives of this invention to provide a heat controlled generator and a cooled array of mono-container generators.

Accordingly, the invention resides in a self-cooling, mono-container fuel cell generator apparatus, characterized by having a layer of interior insulation, a layer of exterior insulation, and a single housing having sides placed between the insulation layers, where a plurality of fuel cells containing electrodes and electrolyte are surrounded by the interior insulation, said generator capable of operating at interior temperatures over about 650° C., and said combination of interior and exterior insulation layers having the ability to control the temperature of the housing below the degradation temperature of the housing material. The housing material could be cast, specialized concrete with appropriate filler materials, molded ceramic, a variety of low-cost commercial steels, or the like. The housing will be a single, discrete (including composite or laminated) layer, for example, molded ceramic or concrete, with an optional, thin, contacting stainless or carbon steel exterior sheeting component. Using a combination of interior and exterior insulation, to control fuel cell generator housing temperature, allows cost and performance advantages, even though the interior insulation may be unprotected, by an interior housing, cannister or the like, against contacting gaseous fuel and fuel combustion products and lose substantial insulating properties. The fuel cells will generally operate at temperatures over about 650° C., usually over about 650° C. and up to about 1250° C. The housing configuration can be square, circular or other geometry, and the fuel cells can operate in the "pressurized" mode, that is over about 2 atmospheres, or about 28.5 pounds per sq. inch (2.0 kg/sq.cm).

The invention also broadly resides in a self-cooling, mono-container fuel cell generator apparatus characterized by having: a layer of interior insulation; a layer of exterior insulation; and a single metal housing having top, bottom and side sections with at least the side section of the housing disposed between the insulation layers, said side section having cooling ducts therein, which ducts in the side section communicate to a source of cooling liquid or gas; a plurality of fuel cells containing electrodes and electrolyte surrounded by the interior insulation; a gaseous oxidant inlet; and a gaseous fuel inlet connected to fuel channels to allow fuel passage to the fuel cells. Here, gaseous oxidant channels from the oxidant inlet can connect to the cooling ducts to allow gaseous oxidant passage through the cooling ducts to the fuel cells, the gaseous oxidant acting as a cooling gas. In this design, the interior insulation is subject to contact by interior gases; a bottom air plenum connects the oxidant inlet manifold to the cooling ducts, which ducts communicate with a top air plenum which can pass gaseous oxidant to the fuel cells; and an ejector can pass fuel from the fuel inlet to the fuel cells. In both described generators, tubular, flat plate and other type high temperature fuel cells can be utilized within the mono-container, and a variety of solid, liquid, a matrix electrolytes can be used with the fuel cells. These generators eliminate use of dual housings; substantially reducing cost and space requirements.

The generator can operate at interior temperatures up to about 1250° C. in a flow of fuel, and oxidant such as oxygen or air, and will also have associated with it and working in cooperation with at least three well known auxiliaries, such as controls; an oxygen or air pre-heater; a fuel gas compressor; a fuel desulfurizer; an oxygen or air compressor which may be operably connected to a turbine; a source of fuel gas; heat exchangers; and a heat recovery unit to recover heat from the hot fuel cell exhaust gases; and a topping combustor, to provide an electrical power generation system.

The invention also resides in a power generation system characterized by containing a plurality of self-cooling, mono-container fuel cell generator apparatus, each generator having: a layer of interior insulation; a layer of exterior insulation; a single metal housing between the insulation layers, the housing containing top, bottom and side sections, the side section of the housing having cooling ducts therein; a plurality of fuel cells surrounded by the interior insulation; a fuel inlet and fuel transfer channels connecting to the fuel cells; and an oxidant inlet and oxidant transfer channels connecting to the fuel cells; where the plurality of generators are positioned next to each other to provide a close packed array of generators, each generator capable of operating at interior temperatures over about 700° C., said array having exterior generator housing side sections and interior generator housing side sections, and where the interior side sections can be cooled by gas or liquid passing through the cooling ducts at the boundary of the interior side sections of the array. This type power system could be, for example, part of an integrated, coal gasification/fuel cell-steam turbine combination power plant, featuring a plurality of coal gasifiers and fuel cell generator arrays or power blocks with associated DC/AC conversion switchgear. This system solves overheating problems associated with an array of close packed generators, and results in substantial internal cost and space savings.

BRIEF DESCRIPTION OF THE DRAWINGS

For a better understanding of the invention, reference may be made to the preferred, non-limiting embodiments exemplary of the invention, shown in the following drawings, in which.

DESCRIPTION OF THE PREFERRED EMBODIMENTS

Figure 1:
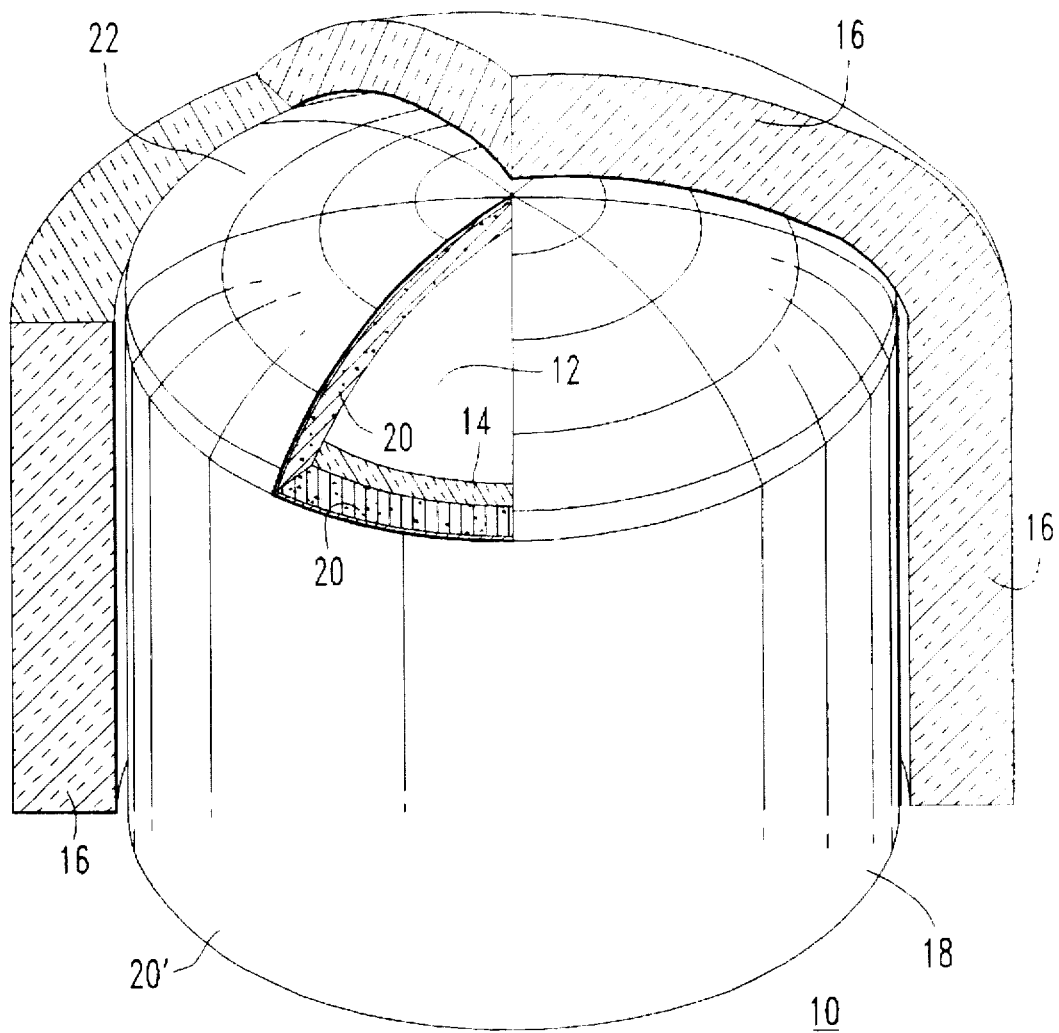
FIG. 1, which best shows the invention, is a three dimensional, cut away view of one embodiment of a single fuel cell generator, having a mono-container whose cooling is controlled by a combination of interior and exterior insulation.

Referring now to FIG. 1 of the drawings, one type of fuel cell generator 10 is shown. The tubular design would make it particularly useful for fuel cell operation at over atmospheric pressures. The interior 12 of the generator 10 would contain a plurality of fuel cells (not shown) which could be of various configurations, for example, flat, corrugated, or tubular, utilizing a variety of electrolytes operable at relatively high temperatures, for example, a phosphoric acid matrix or a solid oxide ceramic, disposed between electrodes, such as air electrodes (the electrode contacted by oxidant such as air) and fuel electrodes (the electrode contacted by fuel, such as reformed coal gas or reformed natural gas). The fuel cells would have associated interconnections and power leads, feed oxidant transfer tubing, feed fuel transfer tubing, and the like. These fuel cells are surrounded by interior insulation layer 14. Exterior insulation layer 16 surrounds at least the sides 18 of the generator housing 20 (here shown as concrete) and will usually also cover the top 22 of the generator housing. The embodiment of the housing shown in FIG. 1 is a "composite", including the main housing 20 of, for example, specialized concrete, such as carbon fiber reinforced concrete or ceramic fiber reinforced concrete for higher temperatures applications, with an optional, contacting, thin sheet of metal such as steel 20', with possible rib or top side reinforcements (not shown). The housing, even if one or more thin component sheets 20' are used, is still defined herein as a single housing or mono-container. There is no major insulation layer between the main housing 20 and any associated optional steel sheets 20'. Preferably, there is no metal layer or other inner layer interior to and sandwiching insulation layer 14 of the FIG. 1 embodiment.

The interior insulation may be in contact with hot fuel gas, mixtures of reacted oxidant and fuel, and possibly hot oxidant gas, at various places within the generator, at temperatures up to 1250° C. and possibly at pressures from 28.5 psi up to 220 psi. (2.0 kg/sq cm up to 15.5 kg/sq cm). As a result, the insulation must be selected from a limited set of materials that can withstand these temperatures and still provide adequate thermal protection for the housing. The insulation generally should be substantially silica-free to avoid possible silica contamination of the fuel cells, especially SOFC, that could potentially degrade performance. Therefore, the interior insulation 14 should be, preferably, of a type of high purity alumina fibers. This alumina material provides good insulation properties, and is available in high purity where silica is minimized. This alumina insulation is quite porous, and does lose some insulating properties when it becomes exposed to reformed fuel found in the typical fuel cell stack.

The exterior insulation 16 can be silica, fiberglass, alumina, or the like, and it will generally be exposed to ambient air. In order for the combination of interior and exterior insulation to cooperate to control fuel cell generator housing temperature to that below the degradation temperature of the housing material, the thickness ratio of (interior insulation):(exterior insulation) should generally be from about (1):(0.2) to (1):(3) that is, 1:0.2 to about 1:3. In experimental operations, a ratio of (1):(0.35) is utilized. It is desirable to have the housing 20 which can be concrete, concrete-metal composite, metal such as steel, or ceramic, at the lowest safe operating temperature to minimize the quantity of the expensive interior insulation. The interior insulation is generally more expensive due to the preferred high purity requirements. The total thickness required for 14 and 20 is determined by overall heat loss permitted, and the desired thermal efficiency of the fuel cell stack. Active cooling of the structural barrier 20 provides an additional feature of the design. The cooling can easily control the temperature of 20 because of the relatively large thermal resistance of interior insulation 14. The coolant could be incoming air used to supply the fuel cell stack, a separate cooling source such as water, chemicals or gases which have to be heated anyway for use or treatment, and thus, just about any liquid or gas economically available.

Figure 2:
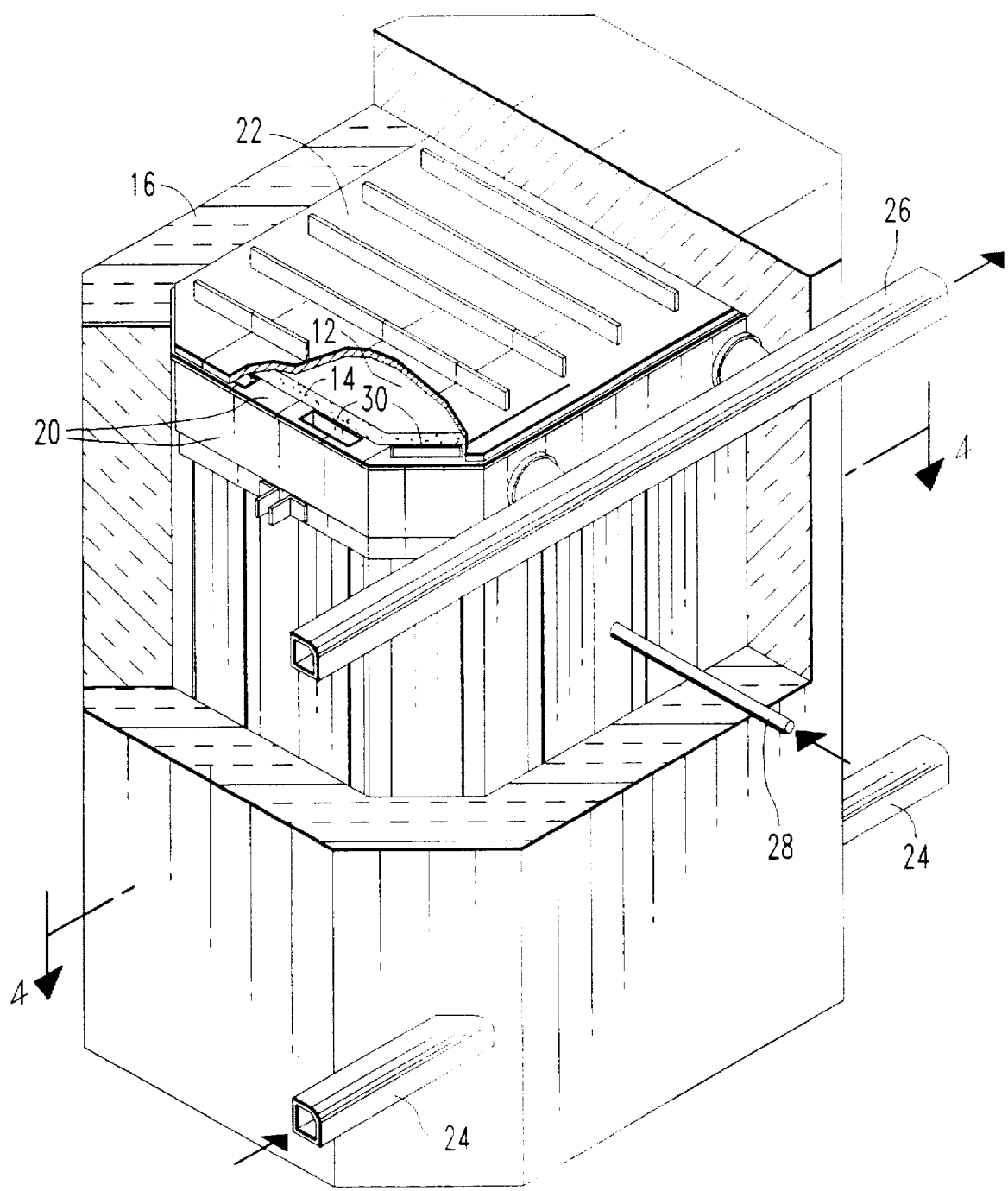
FIG. 2 is a three dimensional, cut away view of another embodiment of a single fuel cell generator, having a mono-container with internal, integral cooling ducts, whose cooling is controlled by the combination of cooling ducts and interior and exterior insulation.

As mentioned previously, the fuel cells used inside the generator shown in FIG. 1 or FIG. 2 can be solid oxide electrolyte or molten carbonate fuel cells of any type or configuration. However, for purposes of simplicity, tubular, solid oxide electrolyte fuel cells will be discussed as an exemplary type useful in this invention, and the description hereinafter will generally relate to that type, which shall in no way be considered limiting as to the scope of the invention.

Solid oxide fuel cells (SOFC) are highly efficient devices that convert chemical energy into electricity. They operate at atmospheric or elevated pressures at a temperature of approximately 1000° C. to produce electricity using a variety of fossil fuels such as coal derived fuel gas, natural gas, or distillate fuel. The temperature of the exhaust gases from the cells is between 500° C. to 850° C., a temperature which is attractive for cogeneration applications or for use in bottoming cycles for all-electric central station power plants.

An operating SOFC readily conducts oxygen ions from an air electrode (cathode), where they are formed, through a solid electrolyte to a fuel electrode (anode). There they react with carbon monoxide (CO) and hydrogen ($H_2$) contained in the fuel gas to deliver electrons and produce electricity. The tubular SOFC features a porous air electrode made of doped lanthanum manganite. A gas-tight electrolyte of yttria-stabilized zirconia (approximately 40 micrometers thick) covers the air electrode, except in a strip about 9 mm wide along the entire active cell length. This strip of exposed air electrode is covered by a thin, dense, gas tight layer of doped lanthanum chromite. This layer, termed the cell interconnection, serves as the electric contacting area to an adjacent cell or to a power contact. The fuel electrode is a nickel-zirconia cermet and covers the electrolyte surface except in the vicinity of the interconnection.

For operation, air is introduced into the fuel cell, generally through an air injector tube. The air, discharged near the closed end of the cell, flows through the annular space formed by the cell and its coaxial injector tube. Fuel flows on the outside of the cell. Typically, 85% of the fuel is electrochemically utilized (reacted) in the active fuel cell section. The gas-impervious electrolyte does not allow nitrogen to pass from the air side to the fuel side, hence the fuel is oxidized in a nitrogen free environment, averting the formation of NOx. At the open end of the cell, the remaining fuel is reacted with the air stream exiting the cell, thereby providing additional useful heat. Reformation of natural gas and other fuels containing hydrocarbons can be accomplished, if desired, within the generator. Incoming fuel can be reformed to $H_2$ and CO within the generator, eliminating the need for an external reformer. All the gas flows and reactions are controlled within the generator apparatus.

To construct an electric SOFC generator, individual cells are "bundled" into an array of series-parallel electrically connected fuel cells, forming a semi-rigid structure that is a basic generator building block. The individual bundles are arrayed in series or parallel to build generator voltage or current, depending on the application, and to form submodules. The parallel electrical connection of the cells within a bundle enhances generator reliability. Submodules are further combined in either parallel or series connections to form the generator module. For a more complete description of tubular fuel cells and their operation in a generator apparatus, reference can be made to U.S. Pat. No. 4,395,468 (Isenberg).

Referring now to FIG. 2 of the drawings, another embodiment of a fuel cell generator 10 is shown. Exterior insulation layer 16 surrounds at least the sides of the generator housing 20, which can be made solely of iron, steel, stainless steel, nickel alloy or other suitable metal. The generator is devoid of an interior cylinder, cannister, or wall adjacent to and interior of the interior insulation 14. The exterior insulation 16 usually also covers the top 22 of the generator housing as shown. Also shown is an oxidant distribution manifold 24, where, for example, air can be fed into the bottom of the generator. Combusted exhaust gas manifold 26 can exit spent fuel and spent oxidant. A fuel, such as previously described, can be fed to the top of the generator through a fuel inlet means, such as piping 28. A cut away section of the top 22, shows top housing 20 with integral cooling ducts 30 and also, interior insulation 14.

Figure 3:
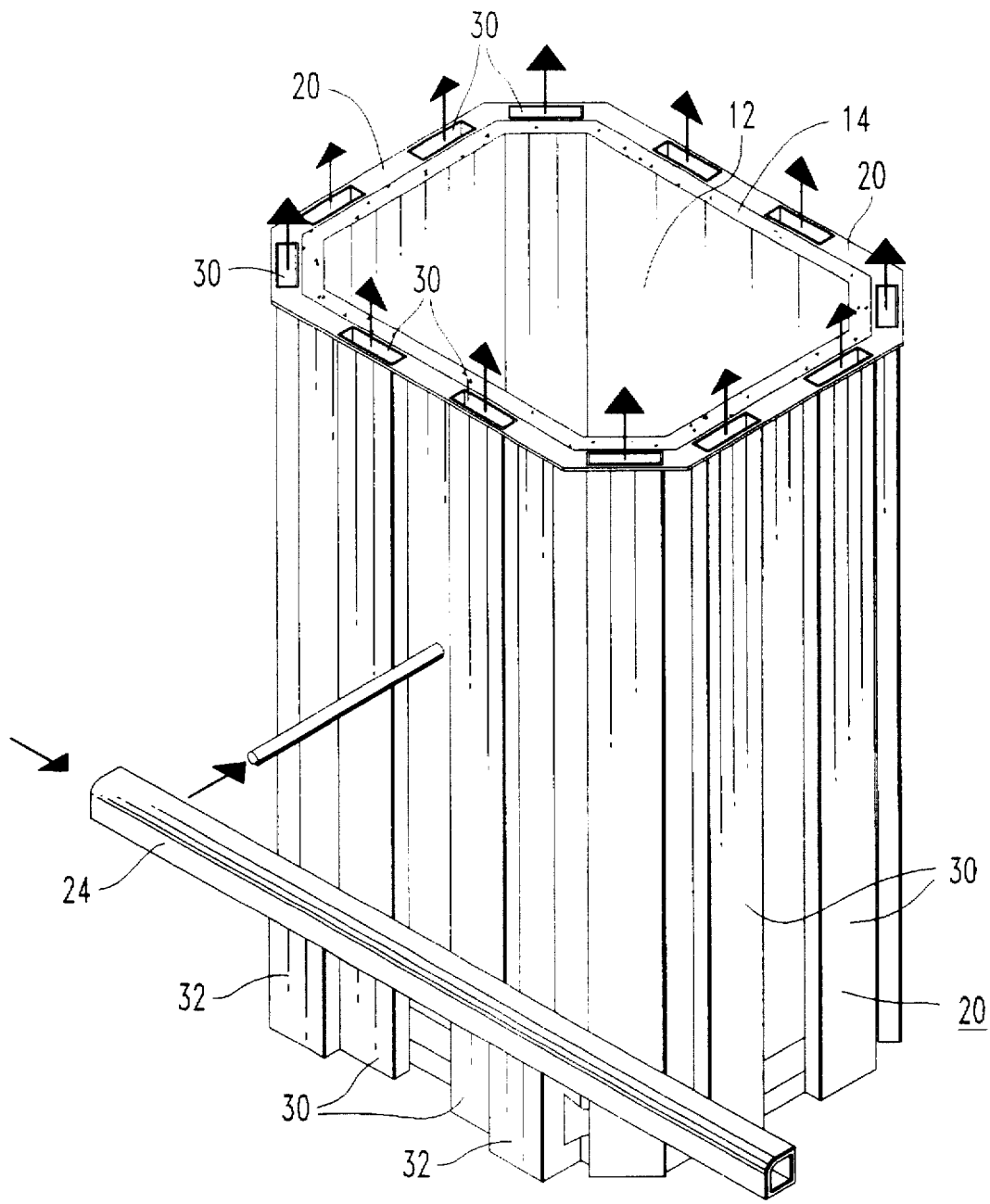
FIG. 3 shows a three dimensional, cut away view of one embodiment of the mono-container of FIG. 2, at a slightly different angle for illustrative purposes, more clearly showing the internal cooling ducts and internal insulation of the generator.

A detailed drawing of the bottom part of the housing 20 is shown in FIG. 3. This housing 20 is a self-cooling, mono-container type, holding interior insulation 14. The housing 20 has at least its sides disposed between interior and exterior insulation, as shown in FIG. 2 and in FIG. 4. Cooling ducts 30 are shown in the sides of the housing 20, preferably surrounding the housing as shown. In one embodiment of the invention, shown in FIG. 3, the bottom of these cooling ducts 30 communicate to a gaseous oxidant inlet, such as the lower air plenum 32, from the oxidant distribution manifold 24. The interior 12 in FIG. 3 of the generator would contain a plurality of fuel cells, as discussed previously, surrounded by the interior insulation 14. A gaseous fuel inlet from the fuel inlet piping 28 could connect to fuel transfer channels, to allow fuel passage to the outside of the fuel cells. Gaseous oxidant transfer channels feed through the cooling ducts 30 to the top of the cooling ducts, to allow passage of oxidant to the interior of the fuel cells. The description of FIG. 4 and FIG. 5 will further detail these oxidant and fuel passages described in this embodiment of the invention. Of course oxidant may be fed directly to the fuel cells similarly to the fuel, and cooling can be accomplished by continuous flow of water or other liquids or gases. The interior insulation in all cases is subject to contact by interior gases. The housing 20 in all cases in FIG. 3 is shown as a rounded off square, but it can be other configurations, for example the side sections could be a continuous tube.

Figure 4:
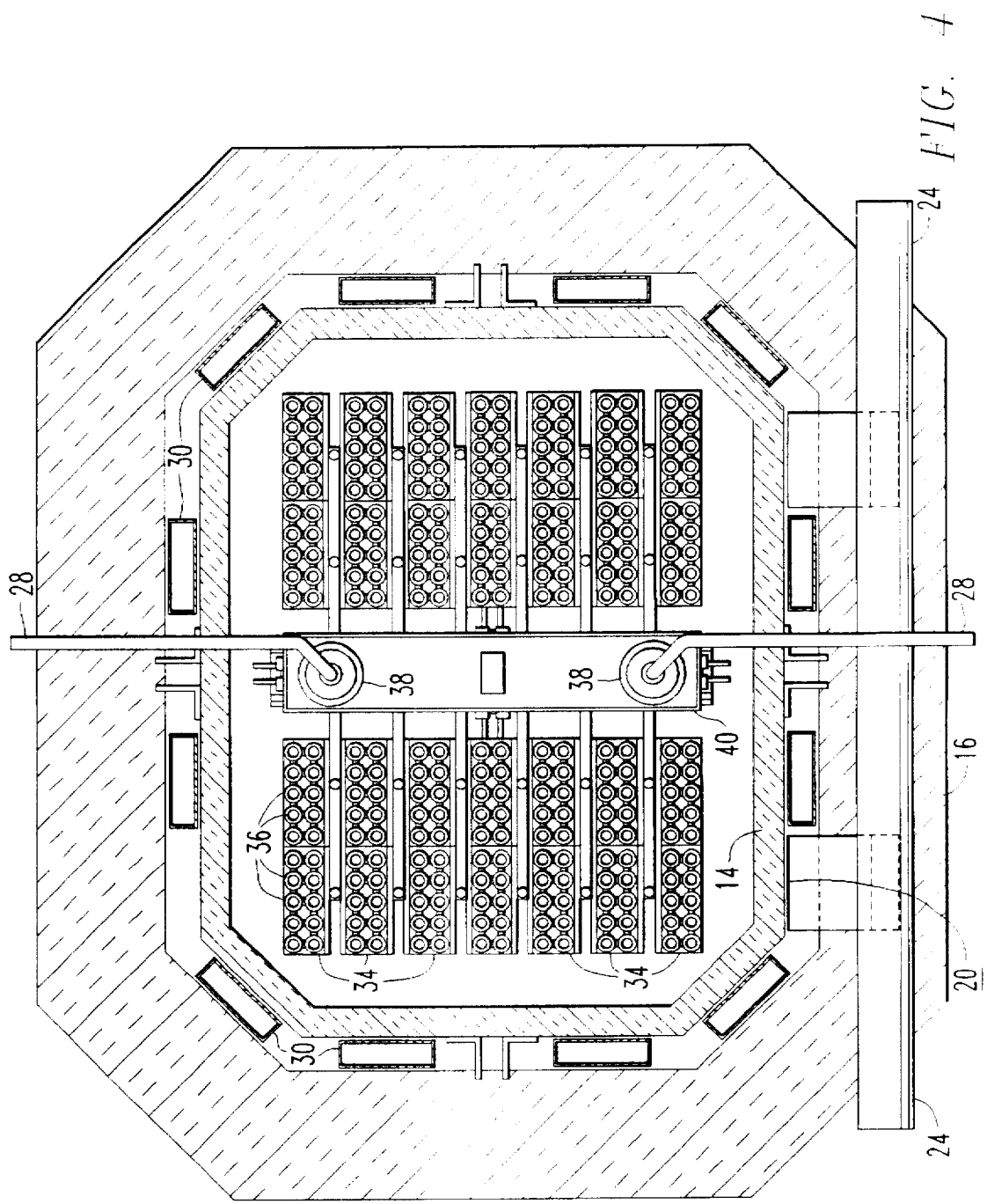
FIG. 4 shows a cross sectional view through line 4—4 of the fuel cell generator of FIG. 2, showing the fuel cells, the internal cooling ducts of the mono-container, the interior and exterior insulation, and fuel inlet piping.

FIG. 4 is a cross section of the insulated generator of FIG. 2 along line 4—4, showing fuel cell bundles 34, each bundle contains a plurality of interconnected fuel cells 36, here shown as of the tubular SOFC type, with electrodes and sandwiched electrolyte. The housing 20, surrounded by interior insulation 14 and exterior insulation 16, contains cooling ducts 30, preferably around its periphery. There is no interior housing, metal or other wall or structure contacting interior insulation 14. The housing 20 does not sandwich the interior insulation 14 between an interior cannister or other member. Fuel would enter fuel inlet piping 28 and pass, preferably to one or more ejectors 38, which are better shown in FIG. 5, where recirculation gases may inject-mix with feed fuel, to provide a stream useful in the reforming section 40 and to otherwise provide optimal operating conditions. The fuel stream 42 then exits reformer 40 and passes through a fuel plenum 44 and into fuel supply lines which transfer or pass at least partly reformed fuel to the outside of fuel cells 36, as shown in FIG. 5, where the fuel reacts along the elongated fuel electrode surface on the exterior of the tubular fuel cells 36.

Figure 5:
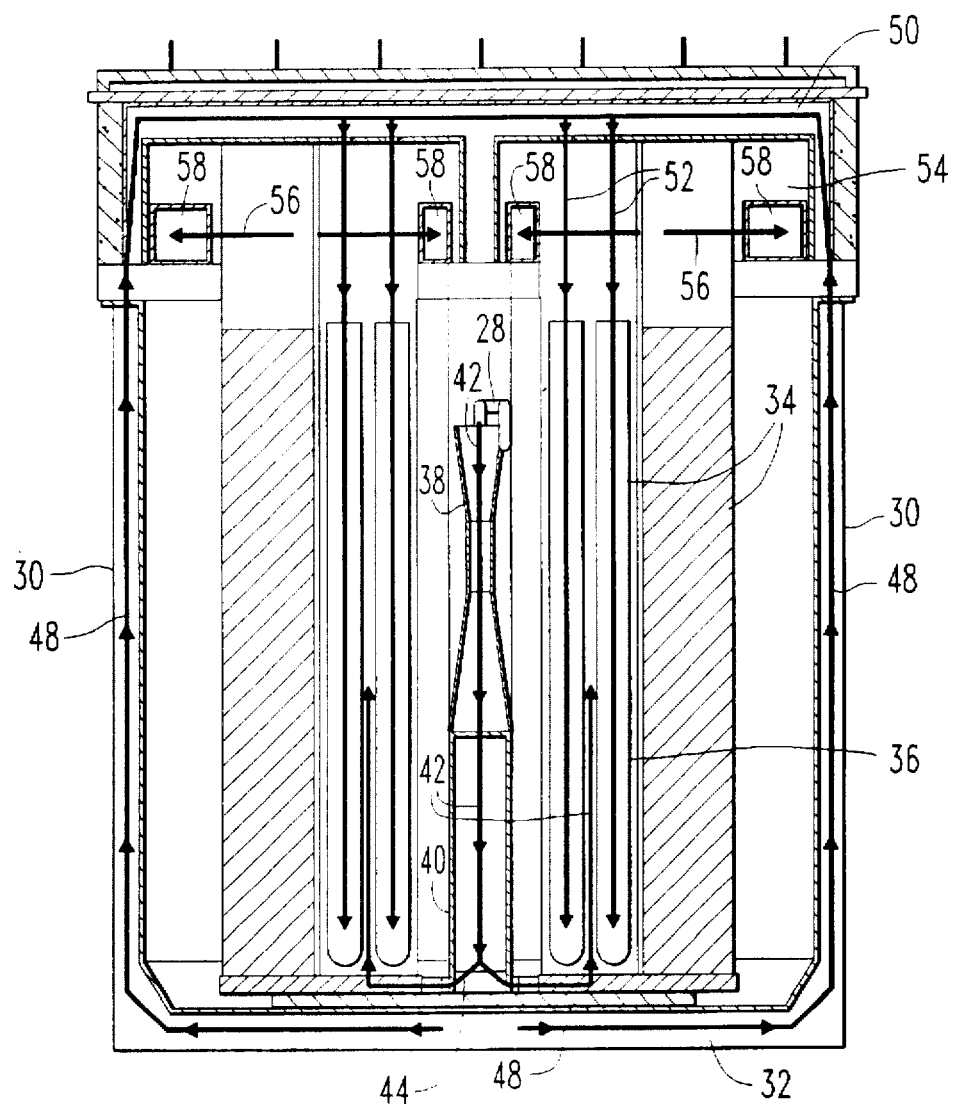
FIG. 5 shows a cross-sectional view of the fuel cell generator of FIG. 2, showing oxidant and fuel flow paths.

As shown in FIG. 5, oxidant enters air plenum 32 as oxidant stream 48 passing upward through cooling ducts 30 to a top air distribution plenum 50. The oxidant stream then is transferred and passes downward via individual oxidant feed tubes 52 into the bottom interior of each fuel cell 36, where, as is well known in the art, the oxidant reverses flow and passes in the annular space between the oxidant feed tube and the interior air electrode, where it reacts along the air electrode interior surface. The reacted oxidant finally enters a combustion section 54 (flow not shown) as spent oxidant. The spent oxidant then combusts with spent fuel to provide exhaust gas 56, part of which may be recirculated to the ejector 38. The rest of the exhaust 56 gas passes through exhaust ducts 58 into the exhaust gas manifold 26, shown in FIG. 2. Further details on these flow patterns as well as use of an ejector system can be found in U.S. Pat. No. 5,169,730 (Reichner).

Figure 6:
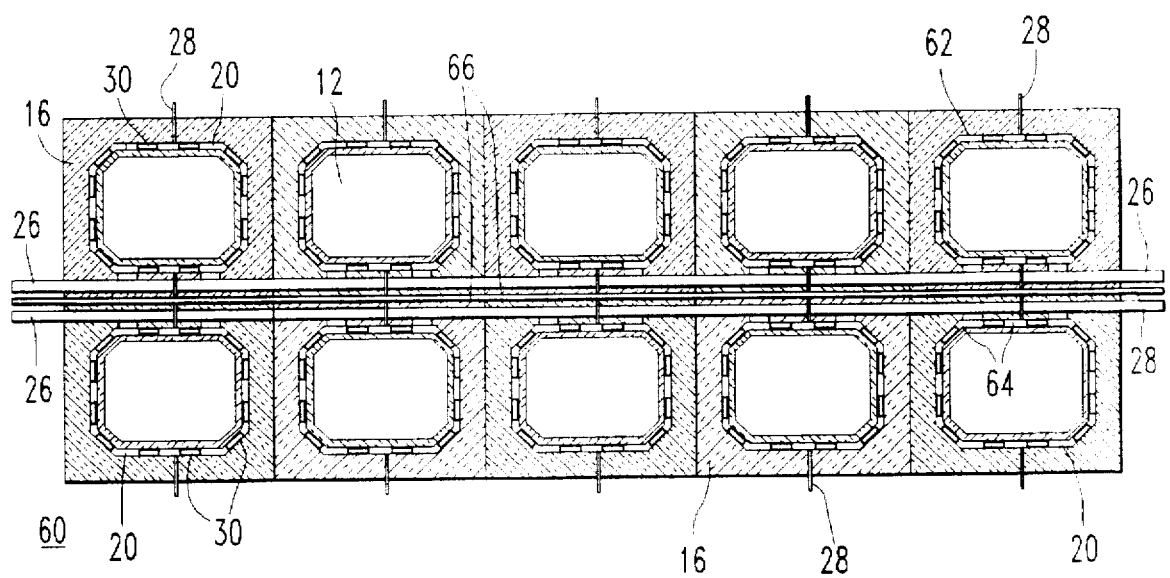
FIG. 6 shows a partial cross-sectional view of one embodiment of an array of ten close packed mono-container generators which provides a compact power block of up to 1.5 MW capacity, with cooling by means of interior and exterior insulation, and oxidant cooling ducts in the interior of the array as well as around the periphery of the array.

Referring now to FIG. 6 of the drawings, an array 60 of ten, insulated, mono-containers are shown as providing a power block. As can be seen, the housings 20, containing cooling ducts 30, are surrounded by exterior insulation 16 (fuel cell generator internals are not shown for the sake of clarity). Exterior generator side sections 62, as well as interior side sections 64 can be cooled by gaseous oxidant passage through the cooling ducts 30. This cooling is especially important at the center interior portions 66 of the array 60, solving overheating problems associated with a close packed generator array and allowing use of a wider section of steels for the container housings 20. Without cooling between the modules, the space between modules would reach stack temperatures of 1000° C. or over. Stable metallic structures for long term use at these temperatures might require exotic, very expensive alloys. The exhaust gas manifolds 26, shown more clearly in FIG. 2 are shown connected together from generator to generator. Fuel feed piping 28 is also shown connected.

Figure 7:
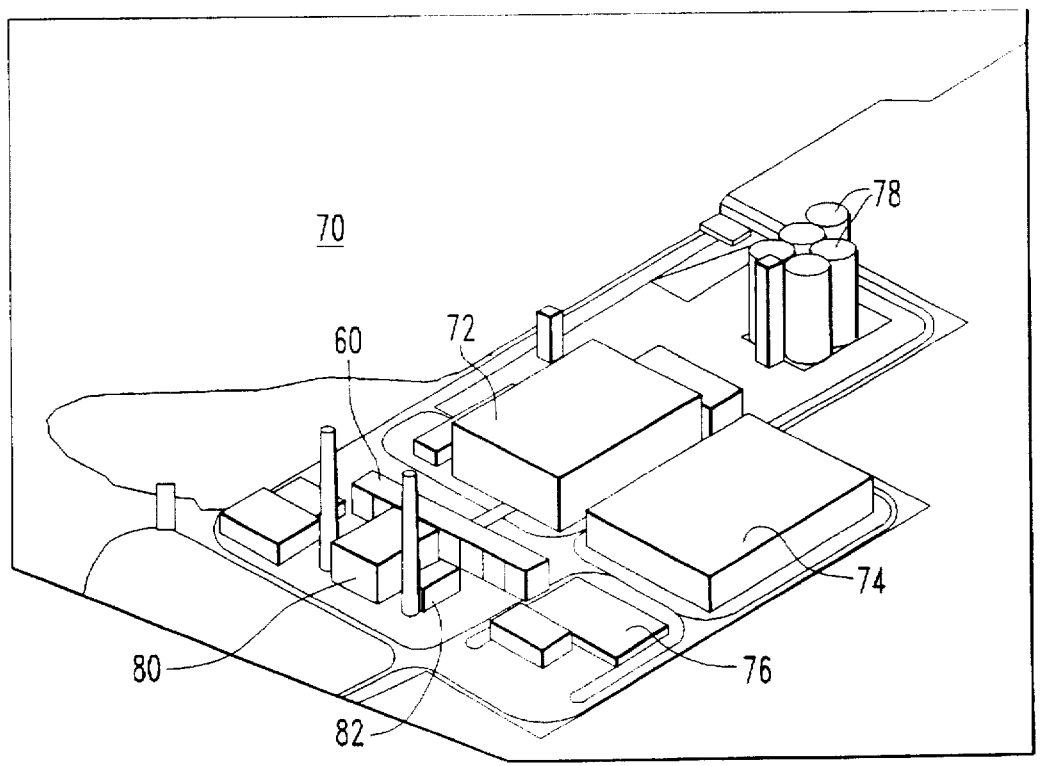
FIG. 7 shows one embodiment of a 300 MW integrated coal gasification/fuel cell-steam turbine power plant, utilizing a plurality of power blocks, such as shown in FIG. 6.

FIG. 7 depicts a 300 MW, integrated coal gasification/fuel cell steam turbine power plant 70. Coal gasification unit 72, air separation (oxygen) plant 74, DC/AC conversion and electrical switch gear and power conditioning unit 76 are shown, along with five, 50,000-ton coal storage silos 78. The fuel feed from the coal gasification units can operate eight SOFC power block arrays 60, described previously, each containing 12 SOFC generators or modules, which in turn are associated with a heat recovery steam turbine 80 and heat recovery steam generator 82. As can be seen, the SOFC blocks can be integrated into a system utilizing a turbine.

In a pressurized SOFC power block system, described previously, a compressor could compress pre-heated air which could be supplied to the fuel cells. The hot gas from the power blocks could be pumped at high pressure to a combustor, producing further heated hot gas that could be expanded in a turbine to produce power. The turbine could in turn run a compressor for pressurizing the oxidant stream, as in U.S. Pat. No. 3,972,731 (Bloomfield et al.). Also, in a pressurized SOFC power block, the hot gas from the power blocks could be directed to a turbine by way of a topping combustor that is supplied with fuel, to produce a still further heated hot gas that is then passed to and expanded in a turbine apparatus as in U.S. Pat. No. 5,413,879 (Domeracki et al.). In the integrated gas turbine/solid oxide fuel cell system, the major components of the system would be a compressor, a turbine, a rotor by which the turbine drives the compressor as well as an electrical generator, a fuel pre-heater, an air pre-heater, a fuel desulfurizer, a solid oxide fuel cell generator with a combustion chamber, a topping combustor and an exhaust stack.

In operation, the compressor, which includes rows of stationary vanes and rotating blades, inducts ambient air and produces compressed air. The compressed air, after flowing through a topping combustor, is heated by the air pre-heater. The air pre-heater, which may be of the finned tube type, has heat transfer surfaces that allow heat to be transferred from the turbine exhaust gas discharged by the fuel pre-heater, to the compressed air, thereby producing heated compressed air. The compressed air can be heated into approximately the 500° C.–600° C. The heated compressed air is then directed to the solid oxide fuel cell generator. Gaseous fuel, which may be natural gas or a coal derived fuel gas, is driven by a pump through the fuel pre-heater. The fuel pre-heater, which may be of the finned tube type, has heat transfer surfaces that allow heat to be transferred from the exhaust gas discharged by the turbine to the fuel, thereby producing heated fuel. The fuel can be heated to approximately 400° C. The heated fuel is then directed to a desulfurizer, which may comprise a vessel containing a bed of sulfur sorbent through which the fuel flows. The fuel exiting from the desulfurizer, preferably, has less than 0.1 ppm of sulfur.

While FIG. 6 and FIG. 7 have been generally described using SOFC, other types of fuel cell could be used in such systems, as described previously. This is only one design that could use the close packed power block arrays of this invention. They are also applicable to SOFC cogeneration systems utilizing steam from boilers; liquified natural gas fueled SOFC, all electric power plants; repowering of existing fossil fuel power plants; and navel ship electrical propulsion.

The use of the self cooled mono-container power block arrays of this invention allows atmospheric or pressurized utilization of commercial SOFC's and have advantages of:

As high as 80% overall efficiency (50% electrical) for cogeneration applications and greater than 50% for natural gas fueled central station power plants.

Where sulfur is removed from the fuel, no SOx is emitted. Because temperatures are only moderately high, NOx emissions have been measured at and may be less than 0.5 ppm.

Low emissions, quiet and low vibration operation, and fuel flexibility permit installation of SOFC systems near load centers or in urban areas.

Rapid response to load change over a broad power range and high efficiency at part load operation would satisfy the requirements of the commercial, industrial and utility markets.

Operating flexibility can produce exhaust temperatures compatible with generating high quality steam for bottoming cycles or for cogeneration systems.

Cooling with process air eliminates the requirement for separate liquid or liquid/air cooling loops and the solid electrolyte eliminates the problems associated with the management of liquid electrolytes.

Modular construction and availability of factory produced SOFC modules will allow the user to respond to load growth demands while minimizing capital exposure.

We claim:

1. A self-cooling mono-container fuel cell generator apparatus, comprising: a layer of interior insulation; a layer of exterior insulation; a single metal housing having top, bottom and side sections with at least the side section of the housing disposed between the insulation layers, said section having cooling ducts therein, the ducts functioning only to pass cooling oxidant gas, which ducts in the side section communicate to a source of cooling oxidant gas; a plurality of fuel cells containing electrodes and electrolyte surrounded by the interior insulation; a gaseous oxidant inlet; and a gaseous fuel inlet connected to fuel channels to allow fuel passage to the fuel cells.

2. The self-cooling, mono-container fuel cell generator apparatus of claim 1, where the combination of cooling ducts, interior insulation, and exterior insulation controls the temperature of the housing below the degradation temperature of the housing metal.

3. The self-cooling, mono-container fuel cell generator apparatus of claim 1, where oxidant channels from the oxidant inlet connect to the cooling ducts to allow gaseous oxidant passage through the cooling ducts to the fuel cells, said gaseous oxidant acting as a cooling gas.

4. The mono-container fuel cell generator apparatus of claim 1, where the interior insulation and exterior insulation layers have a thickness ratio of from about 1:0.2 to about 1:3.

5. The self-cooling, mono-container fuel cell generator apparatus of claim 1, also containing means to supply gaseous oxidant to the fuel cells and means to supply gaseous fuel to the fuel cells where at least one of the supply means is effective to provide pressurized gas to the fuel cells.

6. The self-cooling, mono-container fuel cell generator apparatus of claim 1, where the fuel cells are of tubular fuel cell design and the interior insulation is silica-free.

7. The self-cooling, mono-container fuel cell generator apparatus of claim 1, where the fuel cells are of flat plate fuel cell design.

8. The self-cooling, mono-container fuel cell generator apparatus of claim 1, where the fuel cells are of corrugated monolithic design.

9. The self-cooling, mono-container fuel cell generator apparatus of claim 1, having associated with it at least three auxiliaries selected from controls, oxygen or air pre-heater, fuel gas compressor, fuel desulfurizer, oxygen or air compressor, turbine, heat exchanger, and topping combustor.

10. A plurality of the self-cooling, mono-container fuel cell generator apparatus of claim 1, positioned next to each other to provide an array of generators, said array having exterior generator housing side sections and interior generator housing side sections, where the interior housing side sections contain cooling ducts for passage of oxidant to the fuel cells, said passage of oxidant being effective to cool the interior generator housing side sections.

11. A plurality of mono-container fuel cell generator apparatus of claim 10, where a compressor means to pressurize at least one of oxidant and fuel is associated with the fuel cells and the generator apparatus contains hot exit gas means which pass to a turbine apparatus.

12. The mono-container fuel cell generator apparatus of claim 1, wherein the interior insulation comprises alumina, and the exterior insulation is selected from the group consisting of silica, fiberglass, alumina, and mixtures thereof, and where oxidant form the cooling ducts pass to the fuel cells.

13. A plurality of self-cooling, mono-container fuel cell generators, each generator having: a layer of interior insulation; a layer of exterior insulation; a single metal housing between the insulation layers, the housing containing top, bottom and side sections, the side sections of the housing having cooling ducts therein the ducts functioning only to pass cooling gas or liquid; a plurality of fuel cells surrounded by the interior insulation; a fuel inlet and fuel transfer channels connecting to the fuel cells; and an oxidant inlet and oxidant transfer channels connecting to the fuel cells; where the plurality of generators are positioned next to each other to provide a close packed array of generators, said array having exterior generator housing side sections and interior generator housing side sections, and where the interior generator housing side sections are cooled by the gas or liquid passing through the cooling ducts at the boundary of the interior side sections of the array.

14. The plurality of generators of claim 13, where the interior insulation and exterior insulation layers have a thickness ratio of from about 1:0.2 to about 1:3.

15. The plurality of generators of claim 13, where oxidant channels from the oxidant inlet connect to the cooling ducts to allow gaseous oxidant passage through the cooling ducts to the fuel cells, said gaseous oxidant acting as a cooling gas.

16. The plurality of generators of claim 13, also containing means to supply gaseous oxidant to the fuel cells and means to supply gaseous fuel to the fuel cells where at least one of the supply means is effective to provide pressurized gas.

17. The plurality of generators of claim 13, where the array of generators has associated with it at least three auxiliaries selected from controls, oxygen or air pre-heater, fuel gas compressor, fuel desulfurizer, oxygen or air compressor, turbine, heat exchanger, and topping combustor.

18. The plurality of generators of claim 13, where a compressor means to pressurize at least one of oxidant and fuel is associated with the array and the array contains hot exit gas means which pass to a turbine apparatus.

19. The mono-container fuel cell generators of claim 13, wherein the interior insulation comprises alumina, and the exterior insulation is selected from the group consisting of silica, fiberglass, alumina, and mixtures thereof, and where oxidant from the cooling ducts pass to the fuel cells.

* * * * *